(12) United States Patent
Li

(10) Patent No.: US 9,336,092 B1
(45) Date of Patent: May 10, 2016

(54) SECURE DATA DEDUPLICATION

(71) Applicant: EMC Corporation, Hopkinton, MA (US)

(72) Inventor: Junxu Li, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/588,446

(22) Filed: Jan. 1, 2015

(51) Int. Cl.
H04L 9/32 (2006.01)
H04L 9/00 (2006.01)
G06F 11/14 (2006.01)
G06F 21/60 (2013.01)

(52) U.S. Cl.
CPC ........ *G06F 11/1453* (2013.01); *G06F 11/1464* (2013.01); *G06F 21/602* (2013.01); *G06F 2201/00* (2013.01)

(58) Field of Classification Search
CPC ............ G06F 11/1453; G06F 11/1464; G06F 21/602; G06F 2201/00
USPC .......................... 713/150, 156, 168, 171, 189
See application file for complete search history.

(56) References Cited

U.S. PATENT DOCUMENTS

| 5,442,699 | A | * | 8/1995 | Arnold | ................. | G11B 23/284 |
| | | | | | | 380/1 |
| 5,659,616 | A | * | 8/1997 | Sudia | ................... | G06Q 20/341 |
| | | | | | | 380/30 |
| 5,790,675 | A | * | 8/1998 | Patarin | .................. | H04L 9/3247 |
| | | | | | | 380/28 |
| 5,850,444 | A | * | 12/1998 | Rune | ..................... | G06Q 20/027 |
| | | | | | | 380/30 |
| 6,108,420 | A | * | 8/2000 | Larose | ....................... | G06F 8/61 |
| | | | | | | 380/30 |
| 6,553,494 | B1 | * | 4/2003 | Glass | ..................... | G06F 21/32 |
| | | | | | | 713/176 |
| 6,672,505 | B1 | * | 1/2004 | Steinmetz | ............ | G06Q 20/105 |
| | | | | | | 235/375 |
| 7,051,364 | B1 | * | 5/2006 | Tackman | .............. | H04L 9/3247 |
| | | | | | | 705/80 |
| 7,063,253 | B1 | * | 6/2006 | Brausch | .................. | G06F 21/10 |
| | | | | | | 235/379 |
| 7,234,636 | B1 | * | 6/2007 | Brausch | ............ | G06Q 20/1085 |
| | | | | | | 235/379 |
| 8,041,641 | B1 | * | 10/2011 | Panchbudhe | ........ | G06F 11/1453 |
| | | | | | | 705/52 |

(Continued)

*Primary Examiner* — Haresh N Patel
(74) *Attorney, Agent, or Firm* — Staniford Tomita LLP

(57) ABSTRACT

Data chunks encrypted using an encryption key are backed up to a server. Each chunk is associated with plain and encryption signatures. The plain signature is based on an unencrypted version of a chunk. The encryption signature is based on an encrypted version of the chunk. A new data chunk is identified and a new plain signature for the new chunk is calculated. A request is made for a current key and the new chunk is encrypted using the current key to obtain a new encryption signature. The new encryption and plain signatures are sent to the server for comparison against the existing encryption and plain signatures. If the new encryption signature does not match an encryption signature of an existing chunk and the new plain signature matches a plain signature of the existing chunk, the new chunk is transmitted to the server to replace the existing chunk.

15 Claims, 8 Drawing Sheets

(56) References Cited

U.S. PATENT DOCUMENTS

| | | | |
|---|---|---|---|
| 8,141,142 B2* | 3/2012 | Hourselt | H04L 63/0428 726/10 |
| 8,775,810 B1* | 7/2014 | Snodgrass | H04L 9/08 713/175 |
| 9,100,548 B2* | 8/2015 | Akins, III | H04N 7/1675 |
| 2002/0029337 A1* | 3/2002 | Sudia | G06Q 20/401 713/176 |
| 2002/0186838 A1* | 12/2002 | Brandys | G06Q 20/341 380/30 |
| 2003/0159050 A1* | 8/2003 | Gantman | G06Q 20/3272 713/184 |
| 2004/0153419 A1* | 8/2004 | Wary | G06Q 20/02 705/71 |
| 2005/0039034 A1* | 2/2005 | Doyle | H04L 9/0825 713/193 |
| 2006/0161501 A1* | 7/2006 | Waserstein | G06Q 20/042 705/65 |
| 2006/0294383 A1* | 12/2006 | Austel | G06F 21/606 713/176 |
| 2007/0106892 A1* | 5/2007 | Engberg | G06Q 20/02 713/168 |
| 2007/0198835 A1* | 8/2007 | Mudhar | H04L 63/0442 713/171 |
| 2008/0052698 A1* | 2/2008 | Olson | G06F 8/68 717/168 |
| 2009/0100273 A1* | 4/2009 | Miller | G06F 21/10 713/193 |
| 2009/0121018 A1* | 5/2009 | Bauchot | G06K 19/07345 235/386 |
| 2010/0146283 A1* | 6/2010 | Poitier | G11B 20/00086 713/176 |
| 2011/0173454 A1* | 7/2011 | Paley | H04L 63/10 713/189 |
| 2011/0283362 A1* | 11/2011 | Horneff | H04H 20/38 726/26 |
| 2012/0124014 A1* | 5/2012 | Provenzano | G06F 17/30156 707/692 |
| 2012/0284514 A1* | 11/2012 | Lambert | H04L 9/3263 713/168 |
| 2012/0323717 A1* | 12/2012 | Kirsch | G06Q 20/0855 705/26.1 |
| 2013/0073527 A1* | 3/2013 | Bromley | G06F 17/30156 707/692 |
| 2013/0212413 A1* | 8/2013 | Berndt | G06F 1/3203 713/310 |
| 2013/0305053 A1* | 11/2013 | Laffey | H04L 9/3247 713/176 |
| 2014/0013110 A1* | 1/2014 | Thoniel | H04L 9/083 713/156 |
| 2014/0095886 A1* | 4/2014 | Futral | G06F 21/572 713/187 |
| 2014/0136840 A1* | 5/2014 | Spalka | G06F 21/6218 713/165 |
| 2014/0233732 A1* | 8/2014 | Buer | H04N 21/2347 380/200 |
| 2015/0326572 A1* | 11/2015 | Oyman | H04N 21/23439 726/4 |
| 2015/0350205 A1* | 12/2015 | Oyman | H04L 63/126 726/7 |

\* cited by examiner

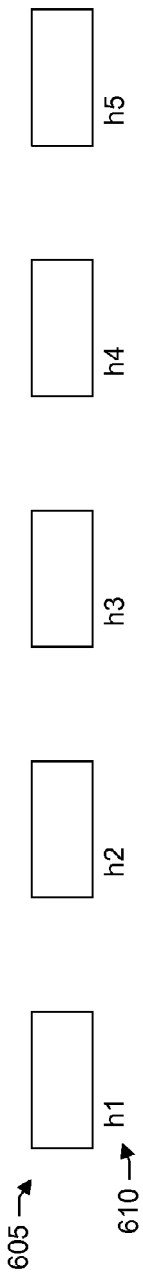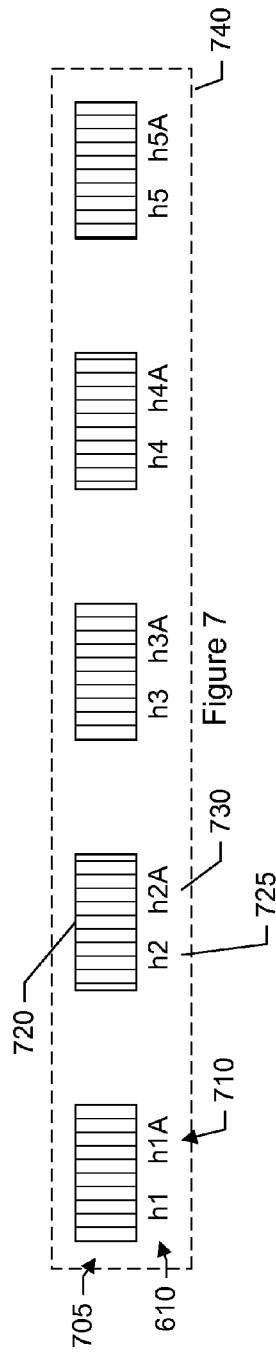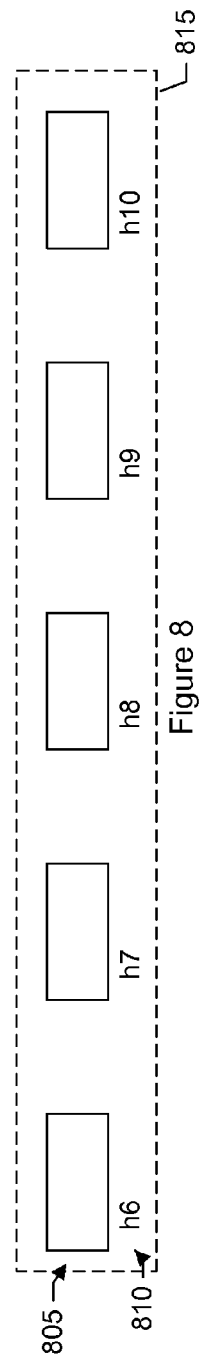

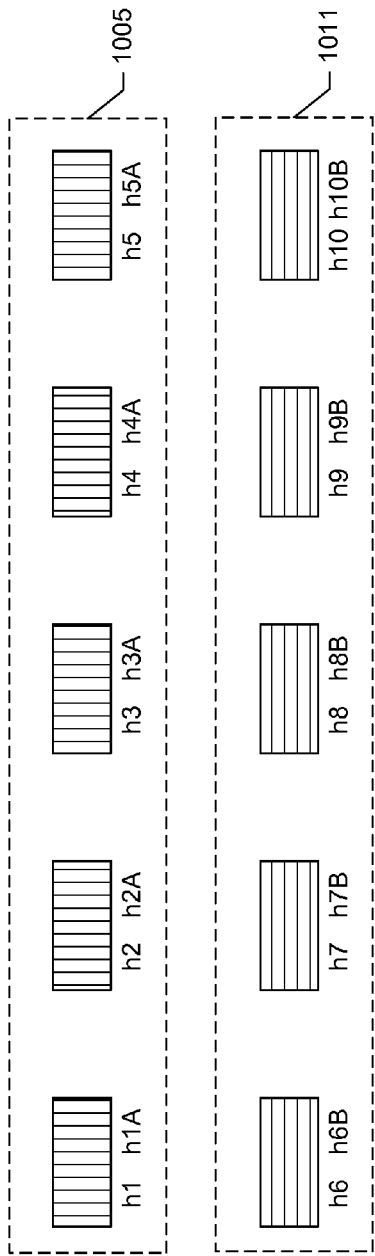
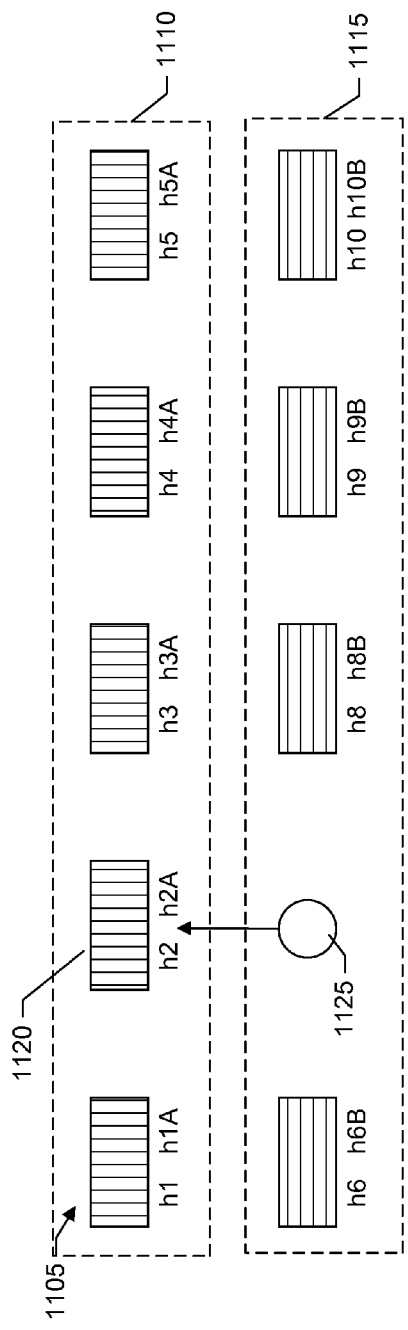

SECURE DATA DEDUPLICATION

BACKGROUND

The present invention relates generally to the field of computer backup systems, and, more particularly, to systems and techniques for deduplication.

Deduplication is a process for removing redundant data during data backup operations. In particular, if two saved objects are duplicates of each other, then only one of the objects needs to be stored. Thus, the amount of data to be stored can be reduced. Deduplication has become ubiquitous in capacity optimized storage systems. Traditionally, data security for deduplication is achieved by establishing a secure connection between a data source (e.g., company) and a data storage target (e.g., cloud storage provider) for unique data chunk transport. Unique data chunks are then encrypted at storage. A chunk refers to a unit of data resulting from dividing content into multiple pieces, i.e., chunks. Encryption is a form of security that turns information, images, programs, or other data into unreadable cipher by applying an encryption key. A key is a variable value that is applied using an algorithm to a string or block of unencrypted text to produce encrypted text, or to decrypt encrypted text.

In the above deduplication scenario, the original data chunk is needed to compute a signature in order to determine if there already is a copy of the data chunk in the backup storage. A problem with this approach is that the data source does not control the encryption. Data security cannot be guaranteed by the data source, since any data read out of the backup storage will be the original unencrypted data. For security purposes, many companies desire that they and they alone control the encryption keys. Many companies also implement internal protocols where encryption keys are routinely changed for security purposes.

Traditional approaches to deduplication cannot be used when the data chunks are encrypted because two identical data chunks encrypted using two different encryption key versions will appear to be different from each other. As a result, the storage target may include many pieces of redundant data having been encrypted using older and newer encryption key versions.

Therefore, there is a need for improved systems and techniques that can be used to deduplicate encrypted data objects while also ensuring the security of the data.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 6 shows an example of data chunks in an unencrypted format in a specific embodiment.

FIG. 7 shows an example of data chunks in an encrypted format in a specific embodiment.

FIG. 8 shows another example of data chunks in an unencrypted format in a specific embodiment.

FIG. 9 shows another example data chunks in an encrypted format in a specific embodiment.

FIG. 10 shows an example of encrypted data chunks from a previous and new backup in a specific embodiment.

FIG. 11 shows another example of encrypted data chunks from a previous and new backup in a specific embodiment.

DETAILED DESCRIPTION

Figure 1:
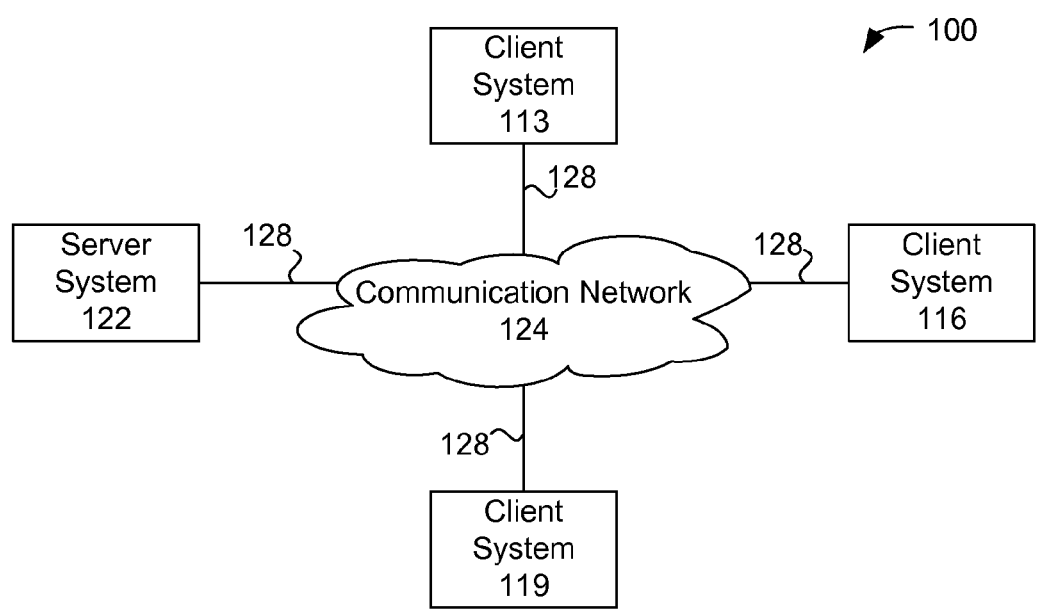
FIG. 1 shows a block diagram of a client-server system and network in which an embodiment of the system may be implemented.

A detailed description of one or more embodiments is provided below along with accompanying figures that illustrate the principles of the invention. While the invention is described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be noted that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device.

For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, Google Chrome provided by Google, Safari provided by Apple Inc., and the Firefox browser provided by Mozilla Foundation, and others.

In an embodiment, a user interfaces with the system through a computer workstation system. The computer system may include a monitor, screen, cabinet, keyboard, and mouse. The cabinet houses familiar computer components such as a processor, memory, mass storage devices, input/output (I/O) controller, display adapter, serial or universal serial bus (USB) port, network interface, speaker, and the like.

Mass storage devices may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on a mass storage device. The source code of the software may also be stored or reside on a mass storage device (e.g., hard disk, magnetic disk, tape, or CD-ROM). As a further example, code may be transmitted via wires, radio waves, or through a network such as the Internet.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or any other appropriate programming language). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows NT, Windows 2000, Windows XP, Windows XP x64 Edition, Windows Vista, Windows 7, Windows CE, Windows Mobile, Windows 8), Linux, HP-UX, TRU64, UNIX, Sun OS, Solaris SPARC and x64, Mac OS X, Alpha OS, AIX, IRIX32, or IRIX64. Other operating systems may also or instead be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 2:
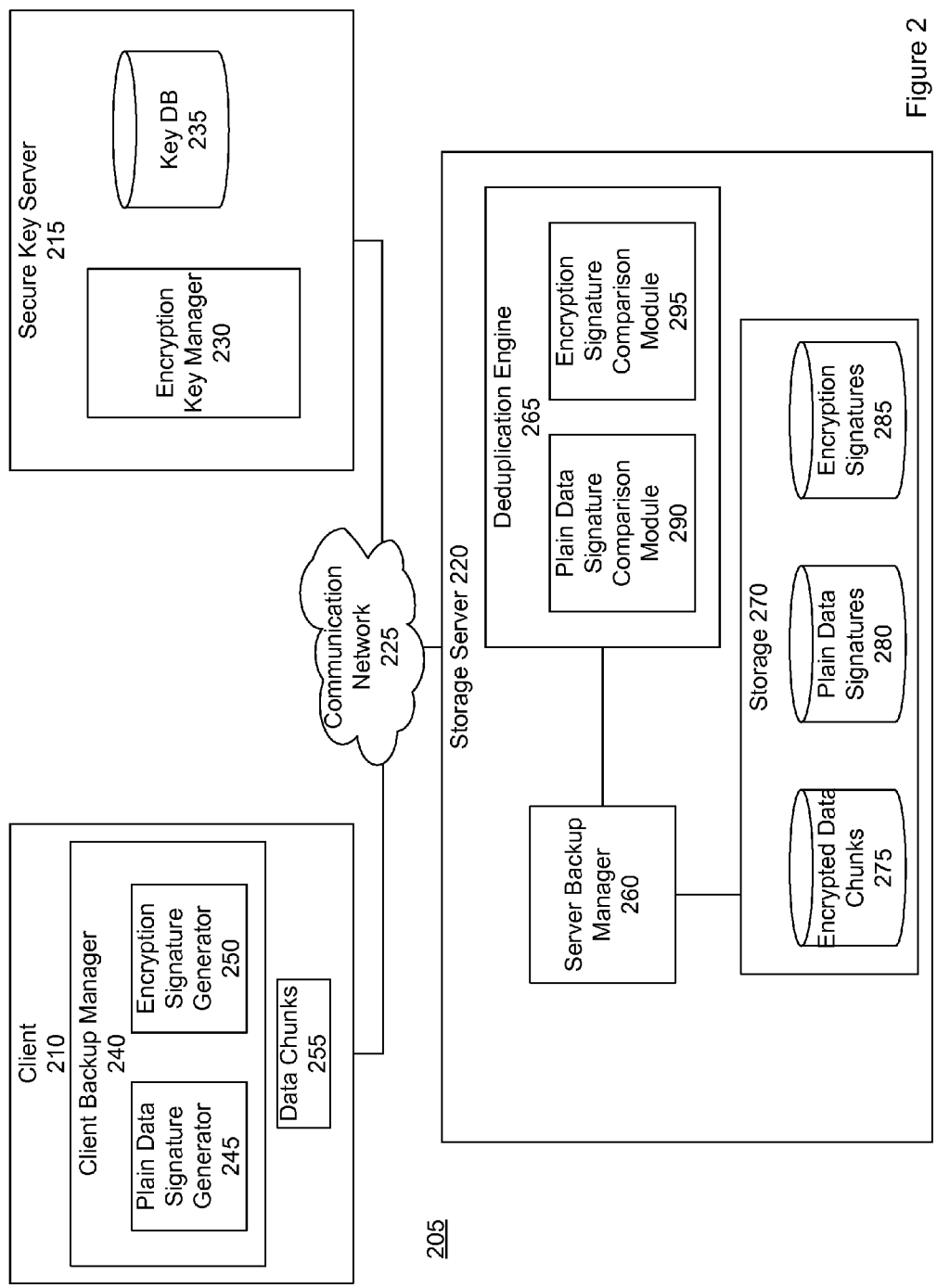
FIG. 2 shows an overall architecture of a system for secure data deduplication in an embodiment.

FIG. 2 shows an overall architecture of a system 205 for secure data deduplication. This system includes one or more clients 210, a secure key server 215, and a storage server 220, each of which are interconnected through a communication network 225. The clients, servers, and communication network may be as shown in FIG. 1 and described above.

In a specific embodiment, a feature of the system provides for a secure key distribution and management scheme that allows data source controlled encryption while enabling data deduplication at the data storage target. Many organizations periodically generate new encryption keys. Changing or rotating keys helps to maintain the security of the organization's data. Changing keys is helpful where a key may have been compromised. Such situations can arise when, for example, employees who may have had access to the key leave the organization, or the key happened to be stored on a portable electronic device (e.g., laptop) which was then lost or stolen. In some cases, there can be governmental regulations that require periodic key rotation. For example, a government organization such as the Central Intelligence Agency (CIA) may require its vendors, contractors, and suppliers to implement, among other things, an internal policy that requires keys to be periodically changed. The system can help to ensure that the data backed up to the server is both unique (e.g., deduplicated) and encrypted with the most current or latest encryption key while also helping to conserve computing and network resources.

Specifically, the secure key server includes an encryption key manager 230, and an encryption key database 235. The key database tracks and stores a history of keys or key versions. The encryption key manager is responsible for managing the lifecycle of an encryption key. The encryption key manager may generate new encryption keys, expire keys, delete keys, maintain the keys in the key database, and respond to key requests from clients. Keys may be generated periodically according to a user-configurable security policy, on-demand, or both. For example, depending upon the security needs of the organization, new keys may be provided every month, every other month, every six months, yearly, or at any other frequency as desired.

The client includes a client backup manager 240, a plain data signature generator 245, and an encryption signature generator 250. The client backup manager is responsible for managing the backup of data from the client to the storage server and the restoration of data from the storage server to the client. The data may be restored to the same or different client. In a specific embodiment, data to be backed up to the storage server is chunked, segmented, or divided into smaller pieces 255 for transmission to the storage server.

For example, a backup image of the client may be several gigabytes in size. Chunking helps to increase the efficiency of the backup process. In particular, if there is a failure during the transmission, the transmission can resume from the last successful chunk rather than having to restart with the very first byte of the backup image or file to be backed up. The size of a chunk may range from about 1 byte to about 64 kilobytes (KB), but generally averages about 8 KB or about 24 KB.

The plain data signature generator computes a signature of the data chunk that is associated with or based on the raw, unencrypted version, or plain data version of the data chunk. This signature may be referred to as a plain signature or plain identifier. The plain data signature generator may apply a hash function to the unencrypted chunk to obtain a hash or hash value. Hashing is the transformation of data such as a string of characters into a usually shorter fixed-length value or identifier that represents the original string. To calculate a hash, an input is provided to a hash function. The value returned by the hash function may be referred to as a hash or hash value. Some examples of hash functions include an MD5 (Message-Digest-Algorithm 5) hash, SHA-1 (Secure Hash Algorithm 1) hash, Bernstein hash, Fowler-Noll-Vo hash function, Jenkins hash function, Pearson hashing, Zobrist hash, and others.

The encryption signature generator computes a signature of the data chunk that is associated with or based on the encrypted version of the data chunk. This signature may be referred to as an encryption signature or encryption identifier. In a specific embodiment, when a data chunk has been identified for backup, the client backup manager issues a request to the secure key server for an encryption key. In response, the secure key server transmits a key to the client. The key may be the most current or latest encryption key. The client encrypts the data chunk using the received key. The encryption signature generator may then apply a signature computation algorithm, such as a hash function as described above, to the encrypted data chunk to produce a hash value, e.g., encryption signature.

The storage server includes a server backup manager 260, a deduplication engine 265, and storage 270. The storage may include a repository 275 to store encrypted data chunks, a repository 280 to store plain data signatures, and a repository 285 to store encryption signatures.

It should be appreciated that the deduplication engine, client and server backup managers, key manager, signature generators, and signature comparison modules may be functional entities where implementation of the functions may vary in different embodiments. For example, in some cases, the plain data signature and encryption signature comparison modules may be combined into one code module. In other cases, the modules may reside in separate code modules.

The server backup manager works with the client backup manager to coordinate the backup of data chunks from the client to the storage server and the restoration of data chunks from the server to the client. The server backup manager is responsible for directing the operation of the deduplication engine to ensure that redundant data chunks are not stored in the encrypted data chunks repository.

Storage repository 275 stores encrypted data chunks received from the clients. Each encrypted data chunk is associated with a plain data signature and an encryption signature. Storage 280 stores the plain data signatures. Storage 285 stores the encryption signatures. There can be an index accessible by the server backup manager to track an encrypted data chunk (e.g., data chunk location) and its corresponding plain and encryption signatures.

The deduplication engine is responsible for deduplicating redundant data. In a specific embodiment, the deduplication engine includes a plain data signature comparison module 290 and an encryption signature comparison module 295. The plain data and encryption signature comparison modules are responsible for comparing plain and encryption signatures associated with a candidate data chunk against the existing plain data and encryption signatures in databases 280, 285, respectively, to determine whether or not the candidate data chunk should be stored.

In some cases, a candidate data chunk will not be stored at the backup storage target because there is an existing data chunk stored at the storage target that is identical to the candidate data chunk. In this case, a reference may be created to the previously existing data chunk. The reference to the previously existing data chunk may be tracked by metadata stored at the storage server so that a backup image or file can be restored using the previously existing data chunk. In other cases, a candidate data chunk will be stored at the backup storage because it is unique (e.g., has not been backed up in previous backups).

In other cases, a candidate data chunk will be stored at the backup storage even though there may be an existing data chunk at the backup storage that is identical to the candidate data chunk. This may occur when the candidate data chunk is encrypted with an encryption key that is more recent than an encryption key used to encrypt the existing data chunk. In this case, the candidate data chunk encrypted using the later key may be used to replace the existing data chunk encrypted using the earlier, prior, or older key. Having data stored and encrypted using a more current encryption key helps to ensure the security of the data. Further discussion is provided below.

More particularly, in a specific embodiment, there is a security domain D that is established. For each security domain D, there are secret keys k(t) established for encryption, and these keys are maintained separately from the data storage target for maximum or good security. In other words, the data storage target will not have access to the keys. For example, the keys may not be stored at the storage server. k(t) indicates a key is used at time t. Every time an encryption key is generated for use, it will be stored in a secure key database 235 that maps time t to a key k(t) for the domain D. All history of keys may be kept intact to avoid decryption issues of historical data, unless some secure data shredding is required. Secure data shredding may include discarding one of keys used for encryption. The key database keeps track of all versions of keys used at different times, and is properly secured and separated from the deduplicated storage (e.g., storage server 220).

Figure 3:
FIG. 3 shows an example of an encrypted data chunk in an embodiment.

In this specific embodiment, after the desired data segmentation algorithm has been applied to a stream of backup data, there will be a series of data chunks that are produced. Then the data source process (e.g., client backup manager) first requests a secret key from the key database associated with a security domain D for the data source. This is denoted as k(t). Then the segmented chunks are encrypted and optionally compressed using k(t) with a generated header described in the table below to form new chunks. FIG. 3 shows a block diagram of a new encrypted chunk that may be produced in a specific embodiment.

TABLE 1

Struct encrypt_chunk_header {
   uint64 key_version;
   uint32 encrypted_chunk_size;
   uint32 original_chunk_size;
   uint32 plain_data_sig_size;
   CHAR[] plain_data_signature;
}

In the Table 1 above, "Key_version" indicates what version of the key is used. "Encrypted_chunk_size" indicates the encrypted data chunk size. "Original_chunk_size" indicates the data chunk size before encryption. "Plain_data_sig_size" indicates the size of plain data signature, which, in a specific embodiment, includes a default size of 16 bytes.

The newly formed chunk can be used to compute a signature to determine if a duplicate of the chunk currently exists in the data storage destination (e.g., storage server 220). The original chunk size can be used to maintain logical offset information for the original data stream before encryption. The encryption algorithm, compression algorithm, signature computation algorithm and domain identifier (ID) can be recorded in the metadata section for the backup stream.

In a specific embodiment, each time a data chunk is to be encrypted at a data source (e.g., client 210) using a k(t), two signatures are computed. A first signature is for encrypted and optionally compressed data. A second signature is for the plain data. The two signatures are then sent to the backend data storage to determine if the data chunk associated with the two signatures is a duplicate. In a specific embodiment, if either of them is a match, then there is no need to send the data chunk to the backend data storage, instead only a reference to identified data chunk is needed to store this data. In a specific embodiment, the plain data signature is used because there could be another copy of the data chunk encrypted using another version of the key, and despite being different in signature (e.g., having different encryption signatures because of the different keys), they refer to the same plain data chunk. However, because signature is one way computation, the secrecy of data is not revealed. In some cases, an encryption signature can be used to determine if there is already an encrypted data chunk in the storage. For example, if two encrypted data chunks each have the same encryption signature, then only one of the encrypted data chunks may be stored, the other of the encrypted data chunk thereby being a duplicate. Non-matching encryption signatures with matching plain signatures, however, would indicate that different versions of keys have been used.

As long as the key is securely distributed and maintained, the data destination need not know and access the secret keys, and the secret keys are only needed at the data source (e.g., backup client). In addition, in a specific embodiment, the identical chunk of data will be encrypted to produce identical encrypted chunks for storage, thus achieving the same level of deduplication. In other words, if the same version of an encryption key is used for the same plain data, then the encrypted data chunk signatures would also match. For example, a first encryption signature obtained from encrypting a first data chunk using an encryption key will match a second encryption signature obtained from encrypting a second data chunk using the same encryption key if the first and second data chunks are identical.

In a specific embodiment, when an encryption key is rotated, a new version is then established and recorded in the secure key database. Because the system also maintains plain data signatures, duplicate data chunks can still be deduplicated without compromising security. In a specific embodiment, if a key is compromised, the system enforces a new version of the key to be used. The results may include a one-time deduplication loss. More particularly, in a specific embodiment, when a key is compromised, the backend storage enforces the replacement of data chunks encrypted with the compromised version of the key with newly encrypted data chunks despite plain data chunk signature matches. Once a new data chunk is produced, that becomes the new unique copy, and the old encrypted data chunk (encrypted with the compromised key) can be removed.

In a specific embodiment, the plain data signature can be used for replication and migration of those data chunks that do not exist in a new data storage target. There is no need to decrypt and encrypt all the data again, unless there is key compromise scenario or the organization wishes to rekey the data according to a security policy. More particularly, in a specific embodiment, when logical data before deduplication is to be replicated or migrated to another site, a deduplication process as described herein may be applied. Not sending redundant chunks by matching plain data signatures helps to minimize or reduce the cost of replication or migration.

For example, during replication or migration of encrypted data chunks from an original data storage target to a new data storage target, plain data signatures of encrypted data chunks at the new data storage target can be compared with plain data signatures of encrypted data chunks at the original data storage target. In this specific embodiment, if a plain data signature for a first encrypted data chunk at the original data storage target matches a plain data signature for a second encrypted data chunk at the new data storage target, the first encrypted data chunk would be determined to be redundant. In this case, the first encrypted data chunk would not be sent to the new data storage target, thereby lowering the cost of replication or migration by, for example, conserving network bandwidth.

A specific application of the system is in a multi-tenant environment, in a multi-tenant environment each tenant may desire full control of the security of the data. This system can be particularly appealing because it does not require disclosure of secret keys to the third party where the data are hosted. The benefits, however, of deduplication are still available. In this scenario, the plain data chunk signature may be used to match within a security domain that is controlled by a single tenant. In a specific embodiment, this data security scheme secures data from a data source for deduplication storage while still maintaining the deduplication benefit. A benefit of the system reduces computation overhead for data replication and migration for encrypted data, when such data can be generated using different encryption keys, and is applicable in multi-tenant environments.

Figure 4:
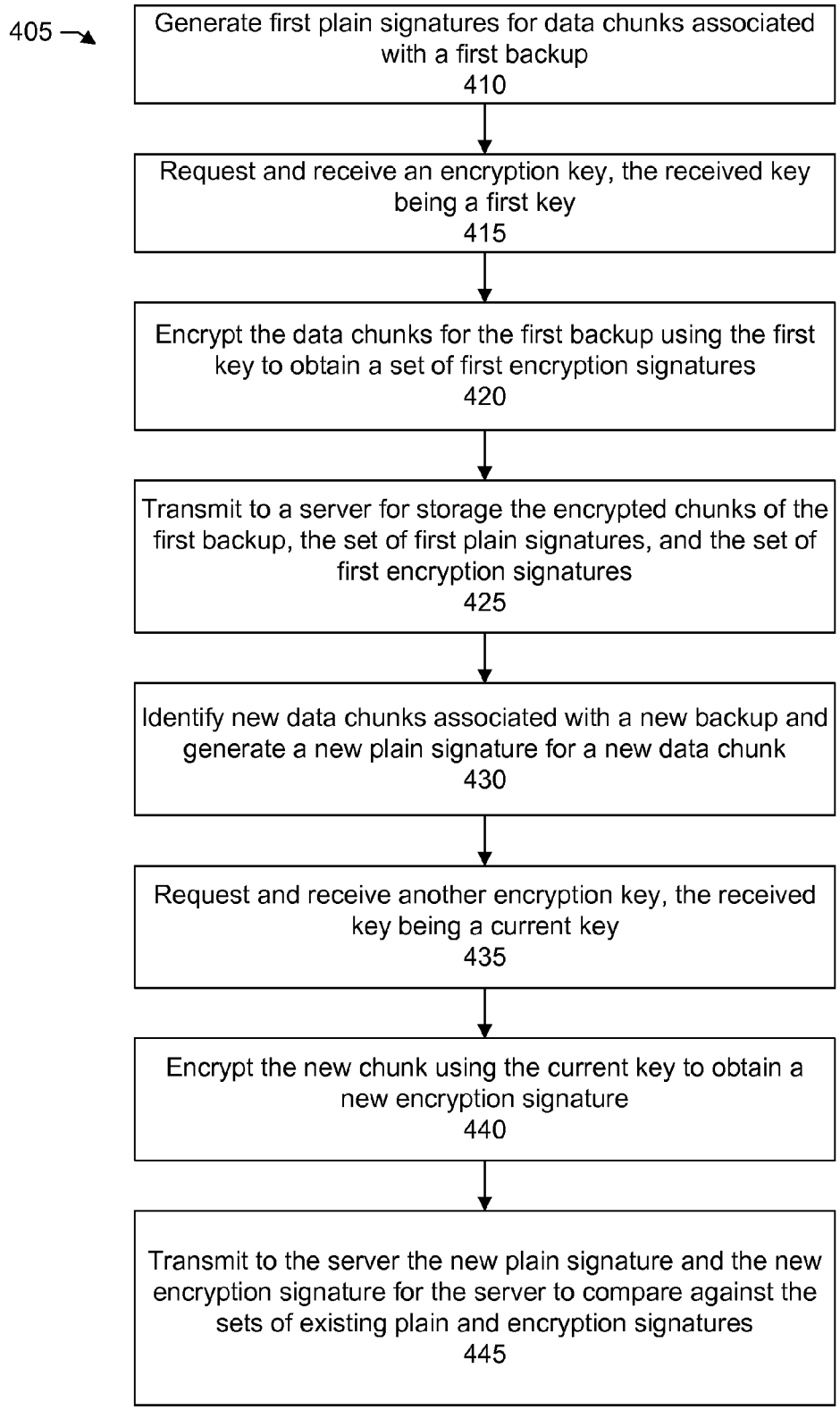
FIG. 4 shows an overall flow diagram of a deduplication process in a specific embodiment.

FIG. 4 shows an overall flow diagram 405 for a specific embodiment of a deduplication backup process. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, a client backup manager generates a set of first plain data signatures for data chunks associated with a first backup. The plain signatures are generated with the data chunks being in an unencrypted format. For example, FIG. 6 shows an example of unencrypted data chunks 605. Each unencrypted data chunk may be hashed to produce a set of hashes or plain data signatures 610 (e.g., h1-h5).

In a step 415 (FIG. 4), the client backup manager requests and receives from the key server an encryption key (e.g., first encryption key). In a step 420, the client backup manager encrypts the data chunks using the first encryption key for the first backup to obtain a set of first encryption signatures. FIG. 7 shows an example of data chunks 605 from FIG. 6 having been encrypted with the first encryption key to produce encrypted data chunks 705. In FIG. 7, the data chunks are shown with a pattern of vertical lines to indicate that they have been encrypted using the first encryption key. The encrypted data chunks may be hashed or otherwise processed to obtain or calculate a set of first encryption signatures 710 (e.g., h1A-h5A).

As shown in FIG. 7, each data chunk is associated with a plain data signature, and an encryption signature, the encryption signature being based on the first encryption key. For example, a data chunk 720 is associated with a plain data signature 725 (e.g., h2), and an encryption signature 730 (e.g., h2A) based on the first encryption key.

In a step 425 (FIG. 4), the client backup manager backs up the encrypted data chunks. In particular, the client backup manager transmits to the server for storage a first backup 740 (FIG. 7). The first backup includes the data chunks encrypted using the first encryption key, the set of first plain signatures, and the set of first encryption signatures obtained based on the first encryption key. The server stores the data chunks in an encrypted format in storage 275 (FIG. 2).

In this example, the data chunks have been encrypted using the first encryption key. The sets of first plain and first encryption signatures may be stored in databases 280 and 285, respectively. A backup index may be updated with metadata indicating, for example, the location of the encrypted data chunks, the identification of the corresponding plain and encryption signatures, the encryption key version, encrypted chunk size, original or unencrypted chunk size, time and date of backup, and so forth.

In a step 430 (FIG. 4), after the first backup of the data chunks, a set of new data chunks for a new backup are identified. A set of new plain signatures corresponding to the set of new data chunks is generated. For example, FIG. 8 shows a set of new data chunks 805 in an unencrypted format for a new backup 815. A set of corresponding new plain signatures 810 (e.g., h6-h7) have been calculated.

In a step 435 (FIG. 4), the client backup manager requests another encryption key from the key server and the key server responds with the current encryption key.

In a step 440, the client backup manager encrypts the new data chunks using the current encryption key to obtain a set of new encryption signatures. FIG. 9 shows an example of new data chunks 805 from FIG. 8 having been encrypted with the current encryption key to produce encrypted new data chunks 905. In FIG. 9, the data chunks are shown with a pattern of horizontal lines to indicate that they have been encrypted using the current encryption key. The current encryption key may the same as the first encryption key or may be different from the first encryption key.

For example, the current encryption key may be more recent than the first encryption key. Whether or not the current key is the same as the first key can depend on factors such as the organization's policy regarding the frequency of key changes, the time duration between the backups, and other factors. The encrypted new data chunks may be hashed or otherwise processed to obtain or calculate a set of new encryption signatures 910 (e.g., h6B-h10B).

As shown in FIG. 9, the set of encrypted new data chunks are associated with corresponding sets of new plain signatures 810 (e.g., h6-h10) and new encryption signatures (e.g., h6B-h10B). For example, a new data chunk 920 is associated with a new plain data signature 925 (e.g., h7), and a new encryption signature 930 (e.g., h7B) based on the current encryption key.

In a step 445 (FIG. 4), the client backup manager transmits to the backup server the new plain signature and the new encryption signature for the server to compare against the respective sets of existing plain and encryption signatures from one or more prior backups such as the first backup. In this step, the new encrypted data chunks are not transmitted to the server. In other words, the new plain and encryption signatures are transmitted from the backup client to the server unaccompanied by or without the associated data chunk content. Network bandwidth can be conserved because signatures are typically much smaller in size than their corresponding data chunk contents.

Figure 5:
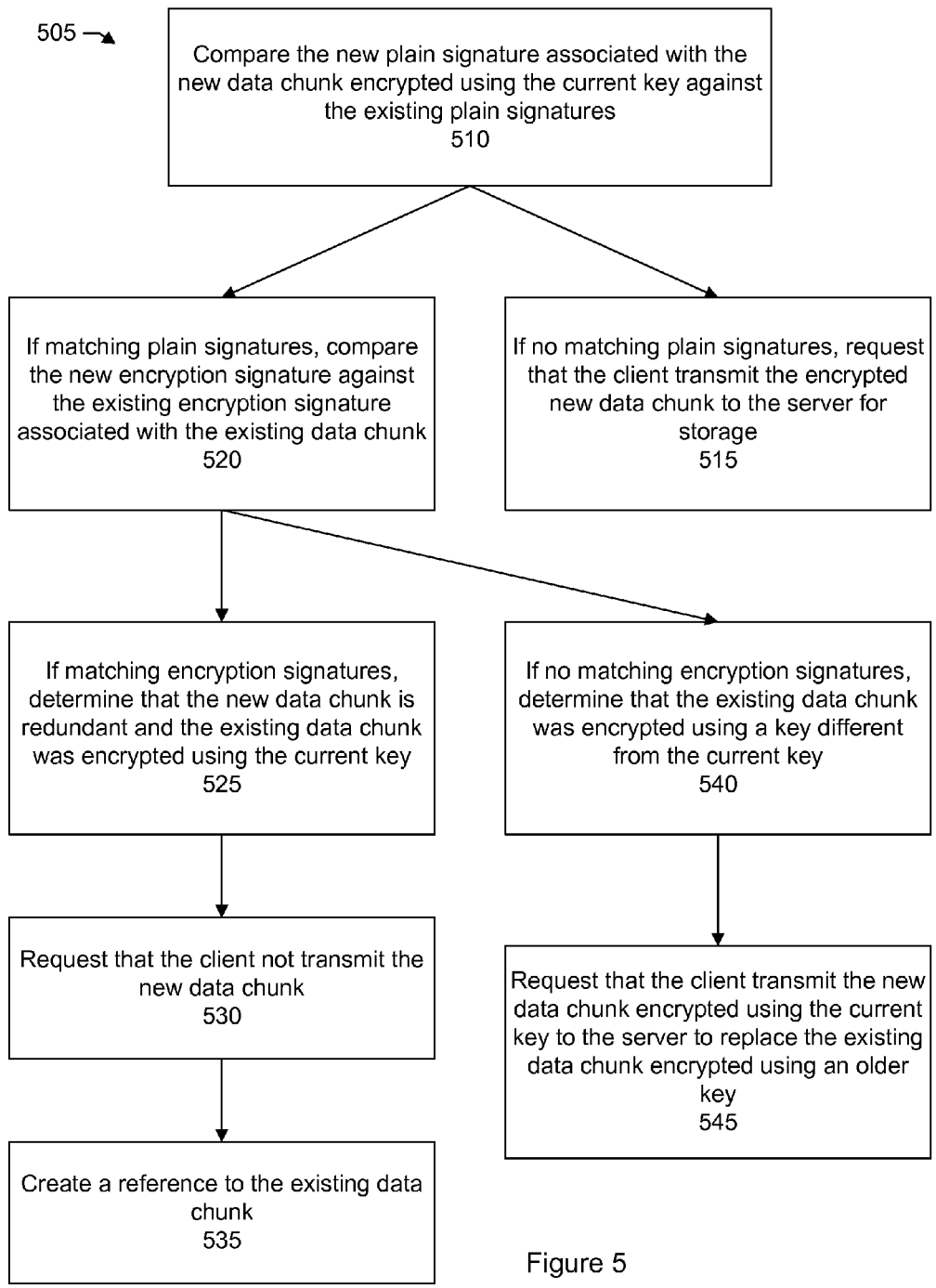
FIG. 5 shows a flow diagram of signature comparison in a specific embodiment.

FIG. 5 shows a flow diagram of a signature comparison process at the backup server. In a step 510, the server receives the new plain and encryption signature associated with the new data chunk from the client. As discussed, the new data chunk is yet to be transmitted from the client. The server compares the new plain signature associated with the new data chunk encrypted using the current encryption key against the set of existing plain signatures. The existing plain signatures are associated with data chunks from one or more previous backups such as the first backup. One or more of the data chunks from the previous backups may be have been encrypted using the first encryption key or a key older than the current encryption key.

In a step 515, if the new plain signature associated with the new data chunk does not match any of the existing plain signatures from the previous backups, the server requests that the client transmit the new encrypted data chunk to the server for storage. Non-matching plain signatures indicate that the new encrypted data chunk is unique. FIG. 10 shows an example where each of the new encrypted data chunks in the new backup were determined to be unique via a comparison of the plain signatures. In other words, in the example of FIG. 10, each of the data chunks from the prior backups (e.g., a first backup 1005) and a new backup 1011 have been determined to be unique.

Alternatively, in a step 520 (FIG. 5) if the new plain signature associated with the new data chunk encrypted using the current encryption key matches a first or existing plain signature of an existing data chunk stored at the server, the server compares the new encryption signature associated with the new data chunk against the first or existing encryption signature associated with the existing data chunk.

In a step 525, if the new encryption signature associated with the new data chunk encrypted using the current encryption key matches the first or existing encryption signature associated with the existing data chunk (and there are matching plain signatures), the system determines that the new data chunk is redundant and that the existing data chunk was encrypted using an encryption key that is the same as the current encryption key.

As a result, in this specific embodiment, there is no need to store the new data chunk at the server because there is an existing data chunk already stored at the server that is identical to the new data chunk and that is also encrypted using an encryption key that is same as the current encryption key. In other words, the existing data chunk is already encrypted using the latest or most recent encryption key.

Thus, in a step 530, the server informs the client that there is no need to transmit the new data chunk as part of the new backup. Not transmitting the new data chunk helps to reduce network usage. In a step 535, a reference can be created for the new backup that refers to the existing data chunk. For example, FIG. 11 shows an example where a set of existing data chunks 1105 have been backed up to the server during a previous or first backup 1110. A data chunk in a new backup 1115 was determined to be identical to an existing data chunk 1120 from the previous backup up. The existing data chunk was also determined to have been encrypted using an encryption key that is the same as the current encryption key. Thus, as shown in the example of FIG. 11, a reference 1125 can be created to refer to the existing data chunk.

Referring now to FIG. 5, in a step 540, if the new encryption signature associated with the new data chunk encrypted using the current encryption key does not match the first or existing encryption signature associated with the existing data chunk (and there are matching plain signatures), the system determines that although the new data chunk is identical to the existing data chunk, the existing data chunk was encrypted using an encryption key different from the encryption key used to encrypt the new data chunk. That is, the existing data chunk may have been encrypted using an encryption key older than the current encryption key.

As a result, in a step 545, the server backup manager may request that the client transmit the new data chunk encrypted using the current encryption key to the server to replace the existing data chunk encrypted using the older encryption key. The existing data chunk may then be deleted in order to conserve storage space. References may be created or updated to refer to the new data chunk that replaces the existing data chunk.

Figure 12:
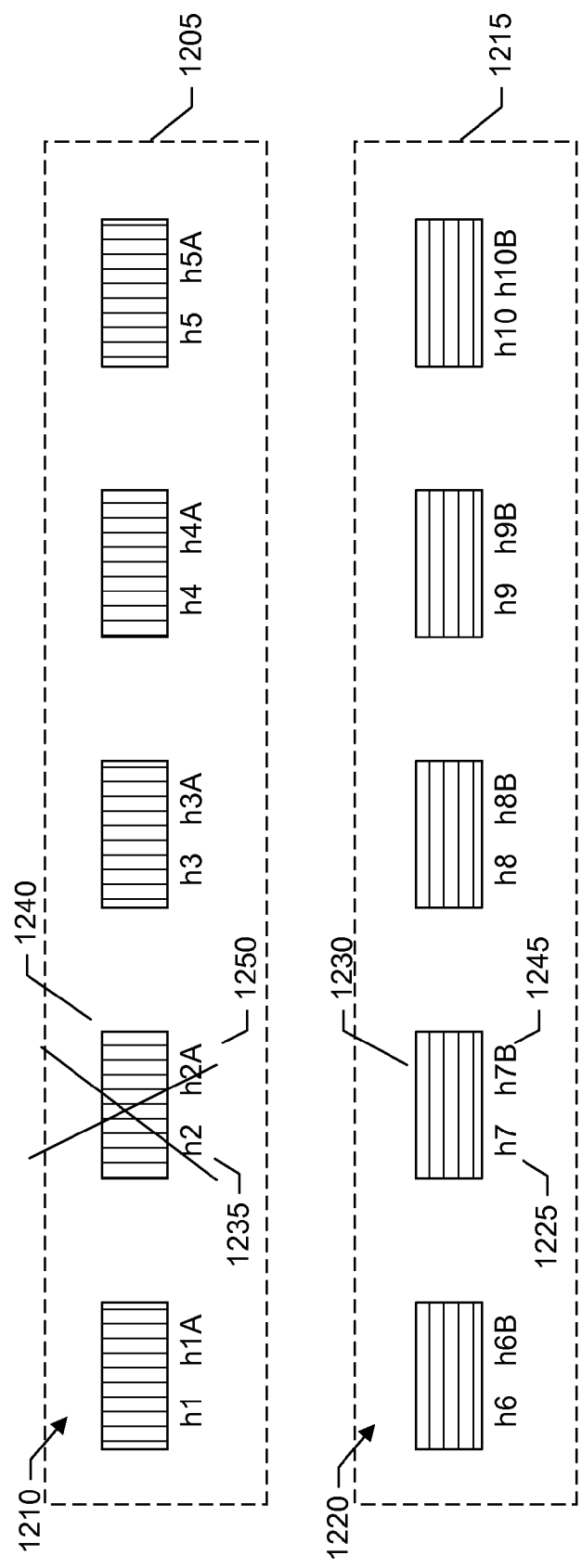
FIG. 12 shows another example of encrypted data chunks from a previous and new backup in a specific embodiment.

For example, FIG. 12 shows an example where a first backup 1205 has resulted in a set of data chunks 1210 encrypted using a first encryption key to be stored at the backup server. During a new backup 1215 for a set of new data chunks 1220 encrypted using a second or current encryption key, a new plain data signature 1225 (e.g., h7) for a new data chunk 1230 was found to match an existing plain data signature 1235 (e.g., h2) for an existing data chunk 1240 from the first or previous backup. The matching plain data signatures thus indicate that existing data chunk 1240 and new data chunk 1230 are identical.

In this example, however, the encryption signatures do not match. That is, a new encryption signature 1245 (e.g., h7B) for new data chunk 1230 is different from an existing encryption signature 1250 (e.g., h2A) for existing data chunk 1240. The non-matching encryption signatures (in conjunction with the matching plain signatures) thus indicate that the existing and new data chunks have been encrypted using different encryption keys. In particular, the new data chunk may have been encrypted using a key that is more recent than the key used to encrypt the existing data chunk. In this specific embodiment, the backup server issues a request to the client to transmit the new data chunk. The existing data chunk (encrypted using the older key) is then replaced (as shown by the "X" in the figure) with the new data chunk (encrypted using the more recent key). A reference may be created for the previous backup that refers to the new data chunk.

If the previous backup is to be restored to the client, data chunk 1230 may be decrypted at the client using the more recent key while other data chunks in the previous backup are decrypted at the client using the corresponding older key. This incremental approach to implementation of the new key can help to balance the competing demands of security and performance. For example, rekeying all existing data chunks when there is a new key may require large amounts of computing resources. Specifically, rekeying may require the data chunks to be transmitted back to the client, decrypted with the older key, encrypted with the new key, and transmitted back to the server. Assuming that the older key has not been compromised, it may not be desirable to enforce a rekeying of the data with each new key change.

In a specific embodiment, whether or not the new data chunk is transmitted to replace the existing data chunk (step 545) is subject to a policy evaluation by the system. In this specific embodiment, the system provides user configurable policies regarding data chunk replacement. For example, an administrator, using the system may configure a policy that specifies existing data chunks encrypted using an older version of a key are to be replaced by identical data chunks encrypted using a later version of the key.

Transmitting data chunks for replacement, however, consumes network bandwidth. Thus, alternatively, the administrator, using the system may configure a policy such that existing data chunks encrypted using the older version of the key are not to be replaced by identical data chunks encrypted using the later version of the key.

In a specific embodiment, a method includes transmitting to a server for storage a plurality of data chunks, plain signatures, and encryption signatures, each data chunk being encrypted using an encryption key and associated with a plain and an encryption signature, the plain signature being based on an unencrypted version of a data chunk, and the encryption signature being based on an encrypted version of the data chunk, after the transmitting, requesting and receiving a current encryption key, encrypting a new data chunk using the current encryption key to obtain a new encryption signature, transmitting to the server the new encryption signature, and a new plain signature based on an unencrypted version of the new data chunk for the server to compare the new plain signature against the plurality of plain signatures, and the new encryption signature against the plurality of encryption signatures, and if the new encryption signature does not match an encryption signature of a data chunk encrypted using the encryption key, and the new plain signature matches a plain signature of the data chunk, transmitting to the server the new data chunk encrypted using the current encryption key to replace the data chunk encrypted using the encryption key.

The method may include if the new encryption signature matches the encryption signature of the data chunk encrypted using the encryption key, not transmitting to the server the new data chunk encrypted using the current encryption key. The method may include if the new plain signature does not match the plain signature of the data chunk encrypted using the encryption key, transmitting to the server the new data chunk encrypted using the current encryption key for the server to store.

The method may include encrypting the data chunk using the encryption key to generate an encrypted data chunk, and hashing the encrypted data chunk to obtain the encryption signature. The encrypting the new data chunk may include encrypting the new data chunk using the current encryption key to generate an encrypted new data chunk, and hashing the encrypted new data chunk to obtain the new encryption signature.

In another specific embodiment, there is a system for deduplicating, the system including a processor-based system executed on a computer system and configured to: transmit to a server for storage a plurality of data chunks, plain signatures, and encryption signatures, each data chunk being encrypted using an encryption key and associated with a plain and an encryption signature, the plain signature being based on an unencrypted version of a data chunk, and the encryption signature being based on an encrypted version of the data chunk, after the transmission, request and receive a current encryption key, encrypt a new data chunk using the current encryption key to obtain a new encryption signature, transmit to the server the new encryption signature, and a new plain signature based on an unencrypted version of the new data chunk for the server to compare the new plain signature against the plurality of plain signatures, and the new encryption signature against the plurality of encryption signatures, and if the new encryption signature does not match an encryption signature of a data chunk encrypted using the encryption key, and the new plain signature matches a plain signature of the data chunk, transmit to the server the new data chunk encrypted using the current encryption key to replace the data chunk encrypted using the encryption key.

In another specific embodiment, there is a computer program product, comprising a non-transitory computer-readable medium having a computer-readable program code embodied therein, the computer-readable program code adapted to be executed by one or more processors to implement a method including: transmitting to a server for storage a plurality of data chunks, plain signatures, and encryption signatures, each data chunk being encrypted using an encryption key and associated with a plain and an encryption signature, the plain signature being based on an unencrypted version of a data chunk, and the encryption signature being based on an encrypted version of the data chunk, after the transmitting, requesting and receiving a current encryption key, encrypting a new data chunk using the current encryption key to obtain a new encryption signature, transmitting to the server the new encryption signature, and a new plain signature based on an unencrypted version of the new data chunk for the server to compare the new plain signature against the plurality of plain signatures, and the new encryption signature against the plurality of encryption signatures, and if the new encryption signature does not match an encryption signature of a data chunk encrypted using the encryption key, and the new plain signature matches a plain signature of the data chunk, transmitting to the server the new data chunk encrypted using the current encryption key to replace the data chunk encrypted using the encryption key.

In another specific embodiment, a method includes receiving and storing from a client a plurality of data chunks, plain signatures, and encryption signatures, each data chunk being encrypted using an encryption key and associated with a plain and encryption signature, the plain signature being based on an unencrypted version of a data chunk, and the encryption signature being based on an encrypted version of the data chunk, receiving a new encryption signature and a new plain signature for a new data chunk, comparing the new plain signature against the plain signatures, determining that a plain signature of a stored data chunk matches the new plain signature, upon the determination, comparing the new encryption signature against an encryption signature associated with the stored data chunk, determining that the encryption signature of the stored data chunk does not match the new encryption signature associated with the new data chunk, and issuing a request to the client to transmit the new data chunk.

In another specific embodiment, a method includes receiving at a server from a client a plurality of data chunks, and a plurality of plain signatures, each data chunk being encrypted using an encryption key not accessible by the server and associated with a plain signature calculated before encryption of a data chunk, storing the plurality of data chunks and plain signatures, after the storing, receiving a new plain signature for a new data chunk, comparing the new plain signature against the plurality of plain signatures, if the new plain signature does not match any plain signature of the plurality of plain signatures, issuing a request to the client to transmit the new data chunk, and if the new plain signature matches a plain signature of the plurality of plain signatures, not issuing the request to the client to transmit the new data chunk.

In another specific embodiment, a method includes receiving and storing from a client a plurality of data chunks, plain signatures, and encryption signatures, each data chunk being encrypted using an encryption key and associated with a plain and encryption signature, the plain signature being based on an unencrypted version of a data chunk, and the encryption signature being based on an encrypted version of the data chunk, receiving a new encryption signature and a new plain signature for a new data chunk, comparing the new encryption signature against the plurality of encryption signatures, determining that the new encryption signature does not match any encryption signature of the plurality of encryption signatures, upon the determination, comparing the new plain signature against the plurality of plain signatures, determining that the new plain signature matches a plain signature of a stored data chunk, the stored data chunk thereby being identical to the new data chunk, and the stored data chunk thereby having been encrypted using an encryption key different from an encryption key used to encrypt the new data chunk, and issuing a request to the client to transmit the new data chunk.

As discussed above, in a specific embodiment, the signature comparison process is performed at the server. In other specific embodiments, the comparison process may instead or additionally be performed at the client. A single new plain signature may be compared to one of a set of existing plain signatures. One of a set of new plain signatures may be compared to a single existing plain signature. A single new encryption signature may be compared to one of a set of existing encryption signatures. One of a set of new encryption signatures may be compared to a single existing encryption signature.

In a specific embodiment, both a new plain signature and a new encryption signature are transmitted from one of the client or server to another of the client or server for comparison. In another specific embodiment, one of the new plain or encryption signature is transmitted and the other of the new plain or encryption signature is transmitted upon request or as-needed. For example, a new plain signature associated with a new data chunk may be transmitted from the client to the server for comparison—unaccompanied by a new encryption signature associated with the data chunk. If there is a match with an existing plain signature, the server may then request that the client send the new encryption signature. If there is not match with an existing plain signature, the server may not require that the new encryption signature be sent. Instead, the server may request that the client transmit the new data chunk for storage. The new data chunk may be stored at the server without the server having compared the new encryption signature against the existing encryption signatures.

As another example, a new encryption signature associated with a new data chunk may be transmitted from the client to the server for comparison—unaccompanied by a new plain signature associated with the data chunk. If there is a match with an existing encryption signature, the server may determine that the new data chunk is redundant and the existing data chunk has been encrypted with the most current key. If there is not a match with an existing encryption signature, the server may request that the client send the new plain signature for comparison with existing plain signatures.

In some embodiments, the plain and encryption signatures are generated upon request or as-needed. For example, as discussed above, one of a new plain or encryption signature may be sent for comparison unaccompanied by another of the new plain or encryption signature. Depending upon the outcome of the comparison, a determination may be made as to whether or not the new data chunk needs to be stored without having to compare a new plain or encryption signature. If such a determination cannot be made, then the new plain or encryption signature will be generated.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    transmitting to a server for storage, a plurality of data chunks, plain signatures, and encryption signatures, each data chunk being encrypted using an encryption key and associated with a plain signature and an encryption signature, the plain signature being based on an unencrypted version of a data chunk, and the encryption signature being based on an encrypted version of the data chunk;
    after the transmitting, requesting and receiving a current encryption key;
    encrypting a new data chunk using the current encryption key to obtain a new encryption signature;
    transmitting, by a processor of a client, via wired communication network, to a deduplication engine of the server the new encryption signature, and a new plain signature based on an unencrypted version of the new data chunk for the server to compare the new plain signature against the plurality of plain signatures, and the new encryption signature against the plurality of encryption signatures; and
    when the new encryption signature does not match an encryption signature of a data chunk encrypted using the encryption key, and the new plain signature matches a plain signature of the data chunk, transmitting to the server the new data chunk encrypted using the current encryption key to replace the data chunk encrypted using the encryption key.

2. The method of claim 1 comprising:
    if the new encryption signature matches the encryption signature of the data chunk encrypted using the encryption key, not transmitting to the server the new data chunk encrypted using the current encryption key.

3. The method of claim 1 comprising:
    if the new plain signature does not match the plain signature of the data chunk encrypted using the encryption key, transmitting to the server the new data chunk encrypted using the current encryption key for the server to store.

4. The method of claim 1 comprising:
   encrypting the data chunk using the encryption key to generate an encrypted data chunk; and
   hashing the encrypted data chunk to obtain the encryption signature.

5. The method of claim 1 wherein the encrypting the new data chunk comprises:
   encrypting the new data chunk using the current encryption key to generate an encrypted new data chunk; and
   hashing the encrypted new data chunk to obtain the new encryption signature.

6. A system for deduplicating, the system comprising:
   a processor-based system executed on a computer system and configured to:
   transmit to a server for storage a plurality of data chunks, plain signatures, and encryption signatures, each data chunk being encrypted using an encryption key and associated with a plain signature and an encryption signature, the plain signature being based on an unencrypted version of a data chunk, and the encryption signature being based on an encrypted version of the data chunk;
   after the transmission, request and receive a current encryption key;
   encrypt a new data chunk using the current encryption key to obtain a new encryption signature;
   transmit, via wired communication network, to a deduplication engine of the server the new encryption signature, and a new plain signature based on an unencrypted version of the new data chunk for the server to compare the new plain signature against the plurality of plain signatures, and the new encryption signature against the plurality of encryption signatures; and
   when the new encryption signature does not match an encryption signature of a data chunk encrypted using the encryption key, and the new plain signature matches a plain signature of the data chunk, transmit to the server the new data chunk encrypted using the current encryption key to replace the data chunk encrypted using the encryption key.

7. The system of claim 6 wherein the processor-based system is configured to:
   if the new encryption signature matches the encryption signature of the data chunk encrypted using the encryption key, not transmit to the server the new data chunk encrypted using the current encryption key.

8. The system of claim 6 wherein the processor-based system is configured to:
   if the new plain signature does not match the plain signature of the data chunk encrypted using the encryption key, transmit to the server the new data chunk encrypted using the current encryption key for the server to store.

9. The system of claim 6 wherein the processor-based system is configured to:
   encrypt the data chunk using the encryption key to generate an encrypted data chunk; and
   hash the encrypted data chunk to obtain the encryption signature.

10. The system of claim 6 wherein the processor-based system is configured to:
    encrypt the new data chunk using the current encryption key to generate an encrypted new data chunk; and
    hash the encrypted new data chunk to obtain the new encryption signature.

11. A computer program product, comprising a non-transitory computer-readable medium having a computer-readable program code embodied therein, the computer-readable program code adapted to be executed by one or more processors to implement a method comprising:
    transmitting to a server for storage a plurality of data chunks, plain signatures, and encryption signatures, each data chunk being encrypted using an encryption key and associated with a plain signature and an encryption signature, the plain signature being based on an unencrypted version of a data chunk, and the encryption signature being based on an encrypted version of the data chunk;
    after the transmitting, requesting and receiving a current encryption key;
    encrypting a new data chunk using the current encryption key to obtain a new encryption signature;
    transmitting, via wired communication network, to a deduplication engine of the server the new encryption signature, and a new plain signature based on an unencrypted version of the new data chunk for the server to compare the new plain signature against the plurality of plain signatures, and the new encryption signature against the plurality of encryption signatures; and
    when the new encryption signature does not match an encryption signature of a data chunk encrypted using the encryption key, and the new plain signature matches a plain signature of the data chunk, transmitting to the server the new data chunk encrypted using the current encryption key to replace the data chunk encrypted using the encryption key.

12. The computer program product of claim 11 wherein the method comprises:
    if the new encryption signature matches the encryption signature of the data chunk encrypted using the encryption key, not transmitting to the server the new data chunk encrypted using the current encryption key.

13. The computer program product of claim 11 wherein the method comprises:
    if the new plain signature does not match the plain signature of the data chunk encrypted using the encryption key, transmitting to the server the new data chunk encrypted using the current encryption key for the server to store.

14. The computer program product of claim 11 wherein the method comprises:
    encrypting the data chunk using the encryption key to generate an encrypted data chunk; and
    hashing the encrypted data chunk to obtain the encryption signature.

15. The computer program product of claim 11 wherein the encrypting the new data chunk comprises:
    encrypting the new data chunk using the current encryption key to generate an encrypted new data chunk; and
    hashing the encrypted new data chunk to obtain the new encryption signature.

* * * * *